United States Patent
Mahmoud et al.

(10) Patent No.: US 6,785,746 B1
(45) Date of Patent: Aug. 31, 2004

(54) DUAL-CHANNEL SCSI CHIPS AND METHODS FOR CONFIGURING SEPARATE INTEROPERABILITY OF EACH CHANNEL OF THE SCSI CHIP

(75) Inventors: Fadi A. Mahmoud, Fremont, CA (US); Stillman Gates, Los Gatos, CA (US); Tracy Kahl, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 392 days.

(21) Appl. No.: 09/680,834

(22) Filed: Oct. 6, 2000

(51) Int. Cl.⁷ .............................................. G06F 3/00
(52) U.S. Cl. ................... 710/8; 710/2; 710/10; 710/11; 710/14; 710/105; 710/300; 713/100
(58) Field of Search ................. 710/2, 8, 10, 11, 710/14, 300, 105; 713/100

(56) References Cited

U.S. PATENT DOCUMENTS

| | | | | |
|---|---|---|---|---|
| 5,572,659 A | * | 11/1996 | Iwasa et al. | 714/6 |
| 5,606,673 A | * | 2/1997 | Chounan | 710/309 |
| 5,745,795 A | * | 4/1998 | Pecone et al. | 710/62 |
| 5,948,076 A | * | 9/1999 | Anubolu et al. | 710/8 |
| 6,065,096 A | * | 5/2000 | Day et al. | 711/114 |
| 6,108,740 A | * | 8/2000 | Caldwell | 710/305 |
| 6,282,647 B1 | * | 8/2001 | Leung et al. | 713/100 |
| 6,295,565 B1 | * | 9/2001 | Lee | 710/301 |
| 6,295,572 B1 | * | 9/2001 | Wu | 710/316 |
| 6,430,645 B1 | * | 8/2002 | Basham | 710/305 |
| 6,446,139 B1 | * | 9/2002 | Leung et al. | 710/1 |
| 6,487,628 B1 | * | 11/2002 | Duong et al. | 710/313 |

OTHER PUBLICATIONS

Intel i960 RM/RN I/O Processor Specification Update; Feb., 2000.
Intel i960 RM/RN I/O Processor Developer's Manual; Jul., 1998.
Intel i960 RM/RN I/O Processor Specification Update; Feb., 2000.

* cited by examiner

Primary Examiner—Jeffrey Gaffin
Assistant Examiner—Eron Sorrell
(74) Attorney, Agent, or Firm—Martine & Penilla, LLP

(57) ABSTRACT

A method for utilizing a multi-channel SCSI chip capable of controlling different types of devices is disclosed. A first channel control is set and a second channel control is set in the SCSI chip. A first peripheral device type is managed using the first channel control and a second peripheral device type is managed using the second channel control.

27 Claims, 11 Drawing Sheets

DUAL-CHANNEL SCSI CHIPS AND METHODS FOR CONFIGURING SEPARATE INTEROPERABILITY OF EACH CHANNEL OF THE SCSI CHIP

BACKGROUND OF THE INVENTION

1. Field of the Invention

This invention relates generally to computing technology and more particularly concerns the configuration of a single SCSI chip to be used as a multi-channel device capable of controlling separate communication for different types of devices, such as SCSI devices and RAID devices.

2. Description of the Related Art

To access and control certain types of peripheral devices connected to a computer system, the computer generally utilizes host adapter cards (or controllers) attached to the computer's peripheral component interconnect (PCI) bus. The computer may also have peripheral device controllers built into the motherboard. These controllers serve to coordinate and manage the data communication to and from the peripheral devices. Controllers may be in the form of a video display adapter, an integrated drive electronics (IDE) controller, a small computer system interface (SCSI) controller, or other similar cards or chips which control peripheral devices. Each of these controllers manage a single type of peripheral device and, if not built into the motherboard, takes up one expansion slot on the PCI bus.

Generally, SCSI controller cards contain a certain type of computer chip known as an application-specific integrated circuit (ASIC). ASICs are usually created for a specific purpose or application such as controlling SCSI devices, RAID arrays, or other similar devices. ASICs that manage SCSI devices are commonly known as SCSI chips. A SCSI controller generally contains one SCSI chip. By use of software device drivers, a host computer can instruct a SCSI chip to manage a specific peripheral device and control the data transfer between the peripheral device and the host computer.

In a computer system with SCSI peripherals, each different type of SCSI device that requires its own processor is connected to a different SCSI chip that controls that type of device. For example, the SCSI devices that interface with additional hardware such as RAID and the SCSI devices that use the computer's CPU require separate SCSI chips/controllers to manage the individual peripheral device types.

FIG. 1 shows a computer configuration where two different types of peripheral devices are connected to a computer system. For example, a SCSI chip A 10 is connected to peripheral devices 16. The SCSI chip A 10 controls the input/output activities of the peripheral devices 16 and regulates the flow of data between the peripheral devices 16 and a host computer with a host central processing unit (CPU) 20. For the control of RAID storage devices, a RAID input output processor (IOP) 14 is connected to a SCSI chip B 12 which is in turn connected to a RAID storage array 18. The RAID IOP 14 manages all the read and write operations to the RAID storage array 18 by directing the SCSI chip B 12 to perform the read and write operations of the RAID storage array 18. As can be seen, in a complex computing environment where numerous types of SCSI peripheral devices (such as CD-ROMs, optical discs, RAID devices, hard disk drives, removable storage drives, tape backup drives, etc.) are connected to a computing system, different SCSI chips may be required to control the different functionality. One SCSI chip can control up to 15 devices with different software to match these device types, but as performance demand increases, it is required to separate higher performance devices by using additional SCSI chips. Furthermore, the option of adding multiple controller chips to a motherboard is limited and significantly increases the price of the system as well as complicating the integration and interoperability. Therefore, a prior art system using different SCSI chips for different types of peripheral devices is inefficient, costly, and more difficult to manage.

SUMMARY OF THE INVENTION

As can be seen, there is a need for a way that a single SCSI chip can control multiple types of peripheral devices having different functionality. Such a way to control a SCSI chip would allow multiple peripheral devices to be connected through a single controller in a PCI slot or a single chip located on the motherboard. This would permit many more peripherals to be connected to a computer and decrease the need for excess computer resources to manage the peripheral devices. Several inventive embodiments of the present invention are described below.

In one embodiment, a method for utilizing a SCSI chip capable of controlling different types of devices is disclosed. A first channel control and a second channel control are set in the SCSI chip. A first peripheral device type is managed using the first channel control and a second peripheral device type is managed using the second channel control.

In another embodiment, a dual channel SCSI chip capable of controlling different types of peripheral devices is disclosed. The dual channel SCSI chip has a first channel for managing a first peripheral device and a second channel for managing a second peripheral device. The dual channel SCSI chip also has a first interrupt which connects with the first channel and a second interrupt which connects with the second channel. An arbiter is also included in the dual channel SCSI chip which controls access of the first channel and the second channel to a memory having configuration information for the dual channel SCSI chip.

In another embodiment a method for utilizing a SCSI chip capable of controlling different types of devices is disclosed. First, a CMOS programming instruction is set in a memory and a computer is rebooted to initialize the computer based on the CMOS programming instruction. Then a system BIOS communicates to establish access to the CMOS programming instruction. A SCSI chip configuration is determined by examining the CMOS programming instruction. A first device ID is then written to a first SCSI chip channel and a second device ID is written to a second SCSI chip channel.

In yet another embodiment a method for configuring a SCSI chip capable of controlling different types of devices is disclosed. First, a CMOS programming instruction is set in a memory. A computer is rebooted to initialize the CMOS programming instruction into a memory. A SCSI chip configuration is determined by examining the CMOS programming instruction. This is done by checking certain bits from the memory to establish types of devices the SCSI chip is required to control. Then a first device ID is written to a first SCSI channel and a second device ID) is written to a second SCSI channel.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method and device to control multiple peripheral devices without having to use multiple ASIC chips, e.g., such as SCSI chips. It will be obvious, however, to one skilled in the art, that the present invention may be practiced without some or all of these specific details. In other instances, well known process operations have not been described in detail in order not to unnecessarily obscure the present invention.

As will be described in greater detail below, a single chip can be made to operate as if it were two separate chips. The single chip (e.g., a SCSI chip) can thus be used in environments where conventional SCSI devices are connected to the computer system and where there is also a need to connect RAID storage devices. As is well known, such implementations are common in computer server environments. In a preferred embodiment, the configuration of the SCSI chip can be done such that each part of the chip can communicate with appropriate processors. For instance, a SCSI channel of a chip can be made to communicate with a computer's CPU while a RAID channel of the same chip can separately communicate with a RAID IOP. Thus, the splitting features (e.g., gattling) of the present invention provide for a robust configuration that improves on overall system efficiency and reduces the cost of implementation.

Figure 1:
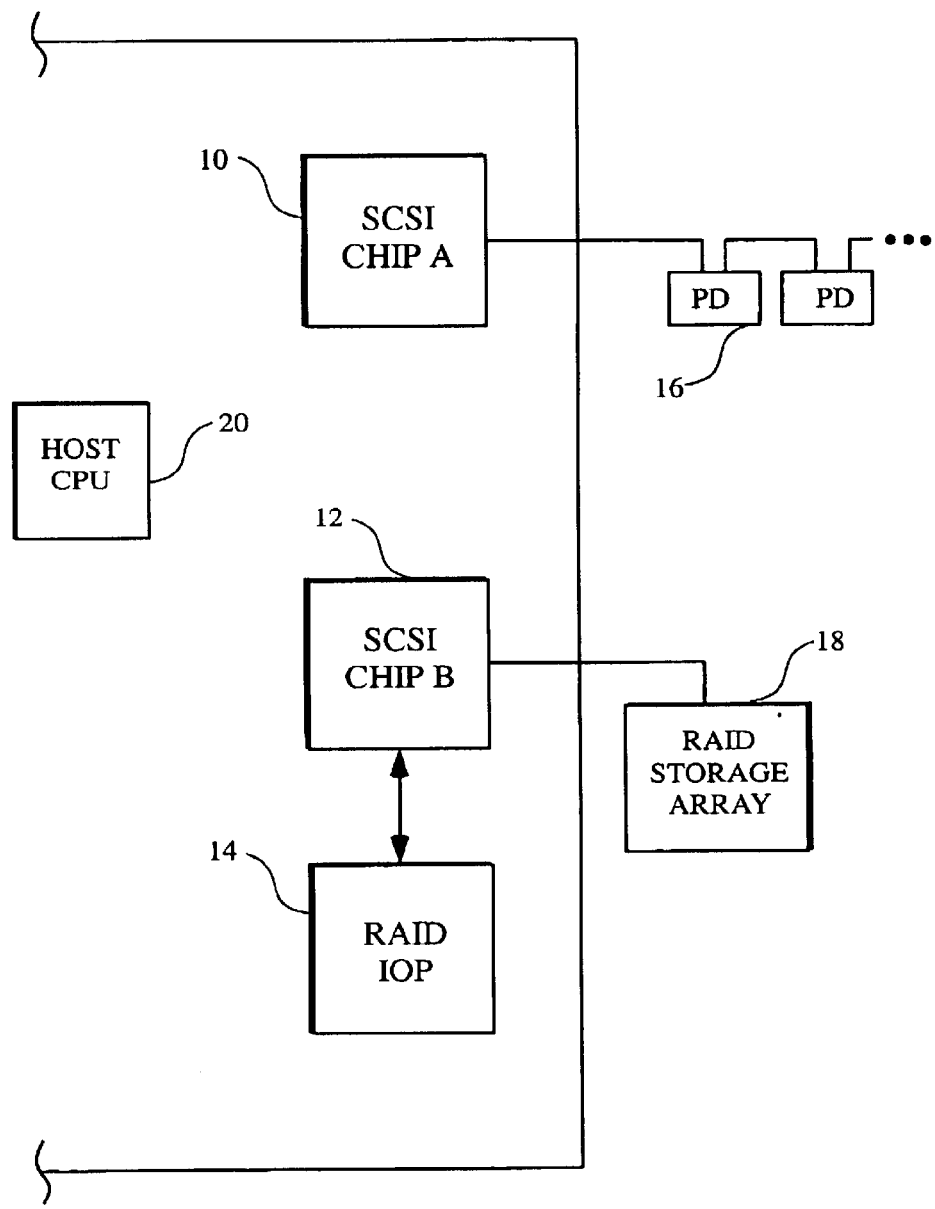
FIG. 1 shows a computer configuration where two different types of peripheral devices are connected to a computer system.
Figure 2:
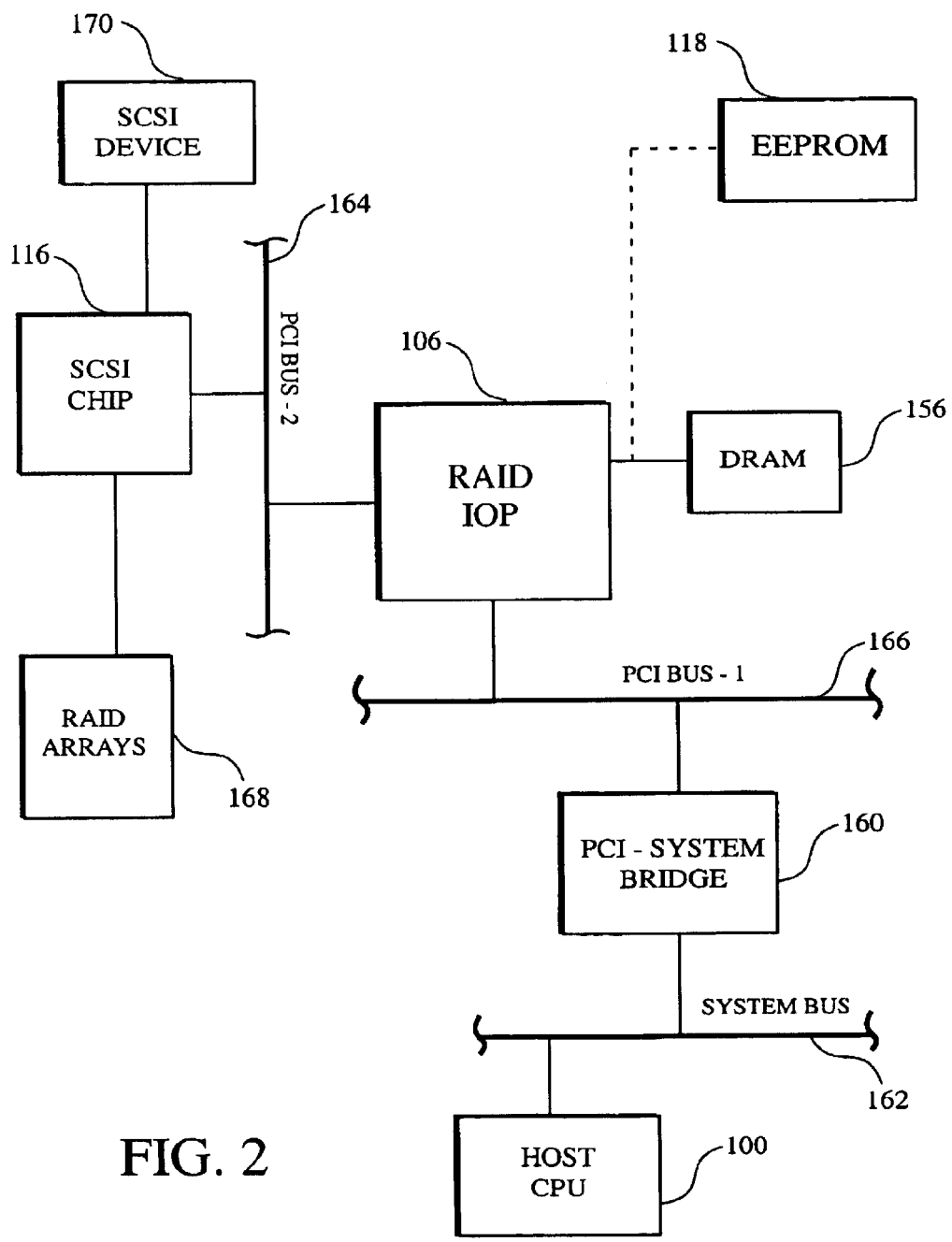
FIG. 2 shows a computing environment including two peripheral devices in accordance with one embodiment of the present invention.

FIG. 2 shows a computing environment including two peripheral devices in accordance with one embodiment of the present invention. A SCSI chip 116 is connected to a RAID input output processor (IOP) 106 through a PCI bus-2 164. The SCSI chip 116 is also connected to a SCSI device 170 and a RAID arrays 168. The RAID IOP 106 is connected to a PCI-System Bridge 160 through a PCI bus-1 166. The PCI-System Bridge 160 is then connected to a host CPU 100 through a system bus 162.

In this embodiment, the host CPU 100 communicates with the SCSI device 170 through the use of the SCSI chip 116. If the host CPU 100 requires data transfer to or from a SCSI device 170, it will instruct the SCSI chip 116 to direct the input and output operations of the SCSI device 170. Similarly, the RAID IOP 106 controls the data transfer from the RAID arrays 168 to the host computer through the use of the same SCSI chip 116. The SCSI chip 116 will take instructions from the RAID IOP 106 and direct the read and write operations of the RAID arrays 168. Therefore, in one embodiment, the SCSI chip 116 controls two different types of peripheral devices. It should be obvious to one skilled in the art that the SCSI chip 116 may be connected to one SCSI device or to any combination of devices. For example, instead of being connected to one SCSI device and one RAID arrays, the SCSI chip 116 may be connected to two separate sets of SCSI devices or to two separate sets of RAID arrays. Therefore, the SCSI chip 116 increases the functionality and efficiency of the computing environment by controlling different types of devices instead of being limited to controlling one type of device.

Figure 3:
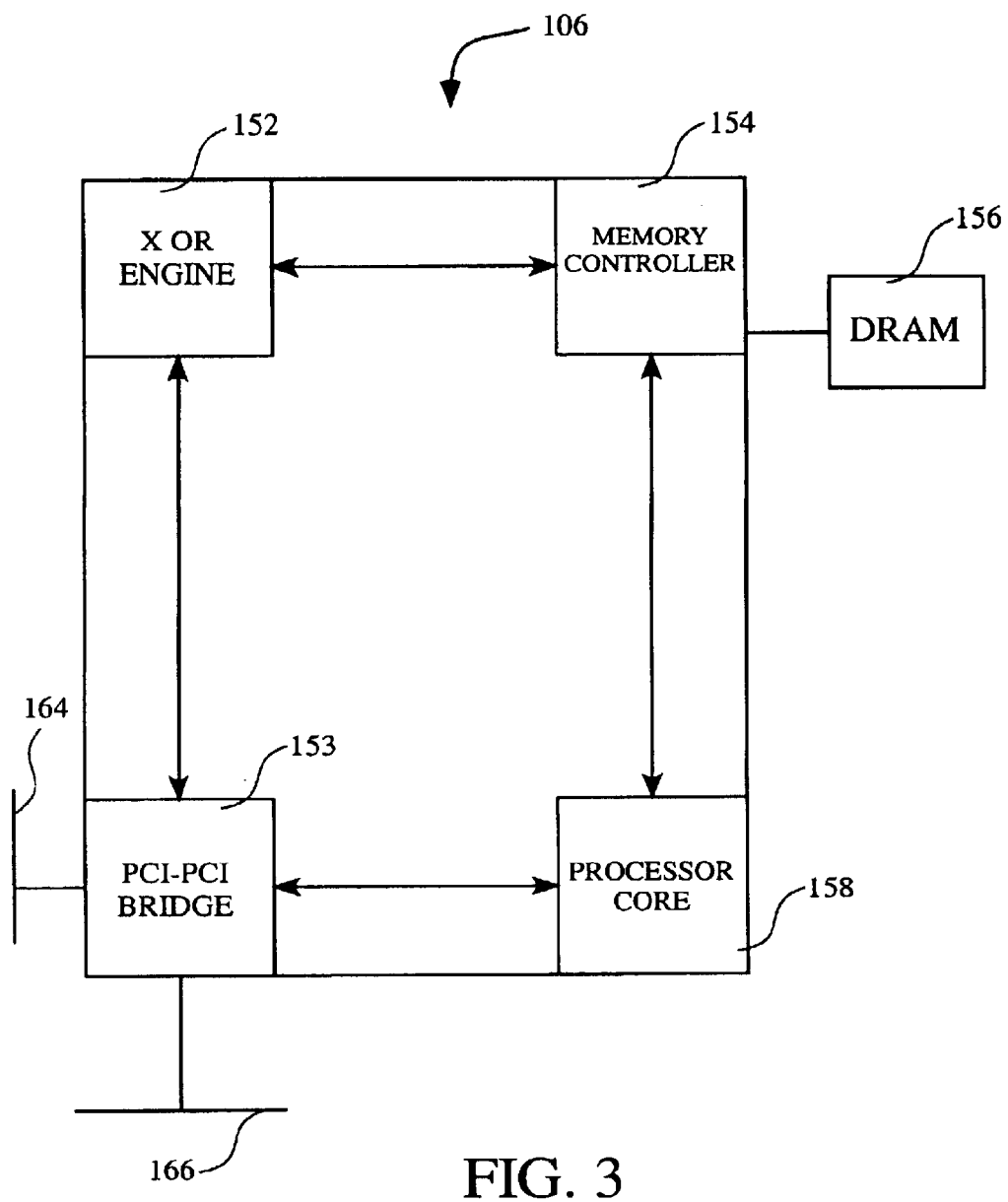
FIG. 3 shows a detailed example of the RAID IOP in accordance with one embodiment of the present invention.

FIG. 3 shows a detailed example of a RAID IOP 106 in accordance with one embodiment of the present invention. An XOR engine 152 is connected to a PCI-PCI bridge 153 which is in turn connected to a processor core 158. The PCI-PCI bridge 153 is also coupled to a PCI bus-1 166 and a PCI bus-2 164. The processor core 158 is further connected to a memory controller 154 which in turn is connected to an external DRAM 156. In one embodiment, the DRAM 156 is a temporary holding location in the process of moving data to and from the host CPU 100 and the RAID arrays 168. It should be appreciated that any the RAID IOP 106 may utilize any type or number of temporary or permanent storage to hold the data.

In one embodiment, the RAID IOP 106 manages the data read and write operations of the RAID array through the use of the SCSI chip 116. In this process, the actual control of the RAID IOP 106 operations is conducted by the processor core 158. When a read request is received from the host CPU 100, the processor core 158 will direct the SCSI chip 116 to retrieve data from the RAID arrays 168. After obtaining the data retrieved from the RAID arrays 168, the data is analyzed using the XOR engine 152. The XOR engine determines whether the data is accurate by XORing parity blocks or bytes retrieved from the RAID array. After the parity blocks or bytes are determined to be correct, the data is transferred to the DRAM 156 by way of the processor core 158 and the memory controller 154.

Conversely, when a write request is received from the host CPU 100, the processor core 158 directs the SCSI chip 116 to write data to the RAID arrays 168. In this type of operation, the memory controller 154 retrieves data from the DRAM 156 and transfers the data to the XOR engine 152 which creates parity bytes or blocks for checking the accuracy of the data. The data is then sent to the SCSI chip 116 by way of the PCI bus-1 166,the PCI-PCI-bridge 153 and the PCI bus-2 164. The SCSI chip 116 then writes the data (including the parity blocks or bytes) to the RAID arrays 168.

Figure 4:
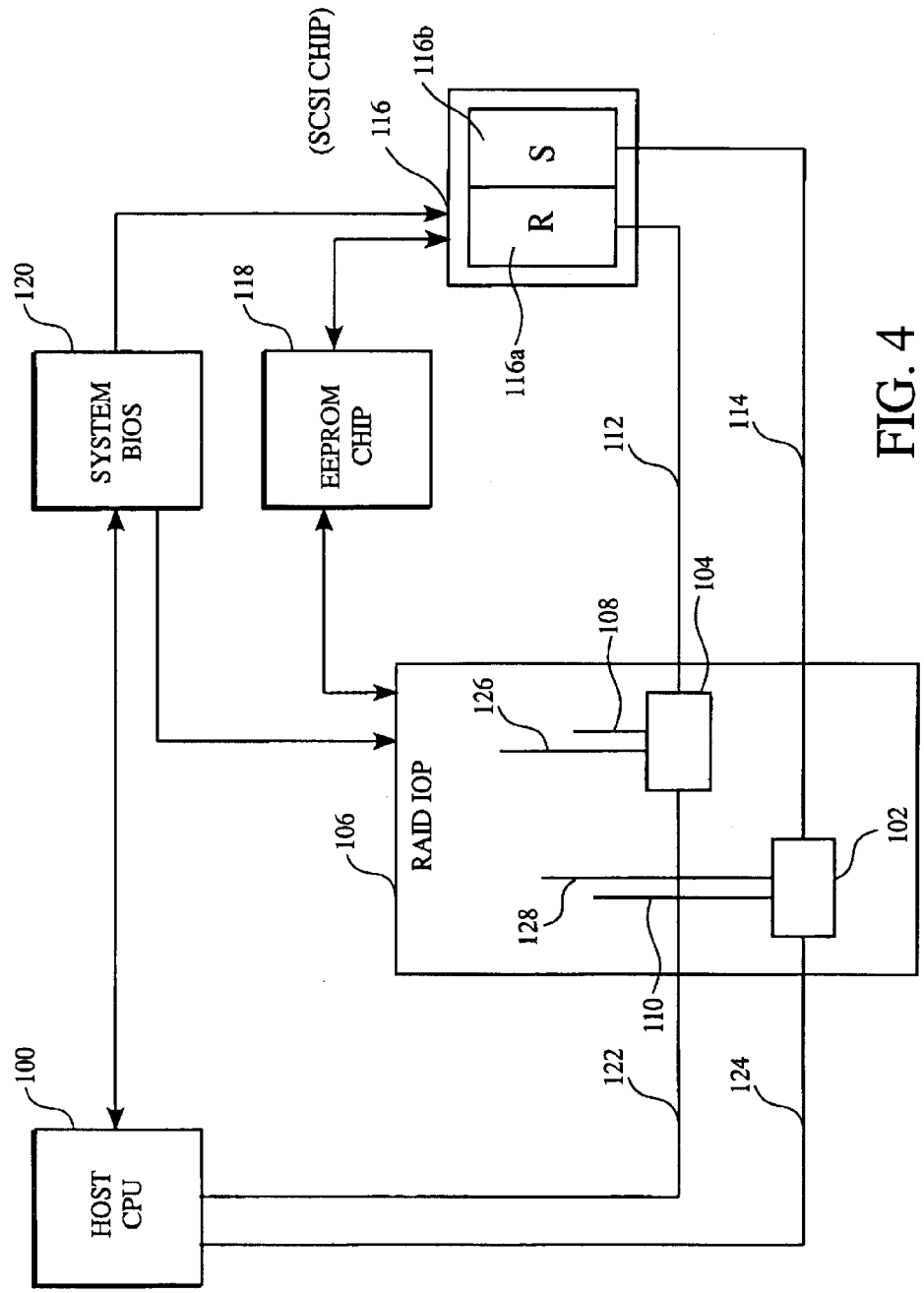
FIG. 4 illustrates an overview of the dual channel SCSI control system in accordance with one embodiment of the present invention.

FIG. 4 illustrates an overview of a dual channel SCSI control system in accordance with one embodiment of the present invention. In this embodiment, the host CPU 100 is connected to a RAID channel control 116a by way of a RAID connection 112 and a connection 122. The host CPU 100 is also connected to a SCSI channel control 116b by way of a SCSI connection 114 and a connection 124. In one embodiment, the RAID connection 112 passes through an interrupt gate 104 to the connection 122, and the SCSI connection 114 passes through an interrupt gate 102 to the connection 124. Both the interrupt gate 104 and the interrupt gate 102 are part of the RAID IOP 106. The interrupt gate 102 is connected to the RAID IOP 106 through an interrupt line 110 and an interrupt line 128. The interrupt gate 104 is connected to the RAID IOP 106 through an interrupt line 108 and an interrupt line 126. The RAID channel control 116a and the SCSI channel control 116b exist in the SCSI chip 116. The SCSI chip 116 is also connected to both a system BIOS 120 and an EEPROM chip 118. The system BIOS 120 is then connected to both the RAID IOP 106 and the host CPU 100. The EEPROM is also connected to the RAID IOP 106.

In one embodiment, the EEPROM 118 contains configuration information for the SCSI chip 116 and the RAID IOP 106. An EEPROM is an electrically erasable, programmable, read-only memory chip which may be programmed and erased in circuit. It should be recognized by one skilled in the art that the EEPROM 118 is only one type of memory such as, for example, flash EEPROM, static RAM with battery backup, and the like that may be used in the present invention. It should also be appreciated that any other type of storage may be utilized in place of the EEPROM.

Upon system startup, the RAID IOP 106 retrieves information regarding channel control configuration of the SCSI chip from the EEPROM chip 118. In this embodiment, this information is in the form of two Gattling bits. These Gattling bits contain information regarding which parts of the SCSI chip 116 are the SCSI channel control 116b and the RAID channel control 116a. As used herein, Gattling bits may refer to any bits, code, or data which may indicate a state of a system, subsystem, registry, hardware, software, or any other computing environment. It should be appreciated that the information regarding the identification of the parts of the SCSI chip 116 may be in the form of any data which can contain such identifying information. After retrieving the two Gattling bits from the EEPROM chip 118 by way of the system BIOS 120, the RAID IOP 106 will set the interrupt gates 102 and 104 depending upon how the SCSI chip 116 is configured, the gates 102 and 104 will be set to SCSI or RAID. In one embodiment, after retrieving the configuration information from the EEPROM chip 118, the RAID IOP 106 will know that the RAID channel control 116a is the part of the SCSI chip 116 which is devoted to RAID control. Therefore, when setting the interrupt gate 104 to RAID, interrupts from the RAID control channel 116a on the RAID connection 112 is directed to the RAID IOP 106 on the interrupt line 126 instead of to the host CPU 100 on the connection 122, and interrupts on the interrupt line 108 from the RAID IOP 106 is directed to the host CPU 100 on connection 122 in its place.

At the same time, through the information contained in the two Gattling bits, the RAID IOP 106 will know that the SCSI channel control 116b is the part of the SCSI chip 116 devoted to SCSI channel control. Therefore, when setting the interrupt gate 102 to SCSI, interrupts from the SCSI control channel 116b on the connection 114 is directed to the host CPU 100 on the connection 124 instead of to the RAID IOP 106 on the interrupt line 128, and interrupts on the interrupt line 110 from the RAID IOP 106 will not be used. The process of retrieving and using configuration information from the EEPROM chip 118 will be further described below. As can be seen, in this embodiment, the SCSI chip 116 has separate channel controls for RAID and SCSI. It should be appreciated that although the gattling (e.g., splitting of the chip for simultaneous and independent operation) of the SCSI chip 116 is described herein with regard to using one channel for pure SCSI and another channel for RAID operation, the gattling of the SCSI chip also has application in cases where each of the two separate channels is used for pure SCSI or for two separate RAID systems.

Figure 4A:
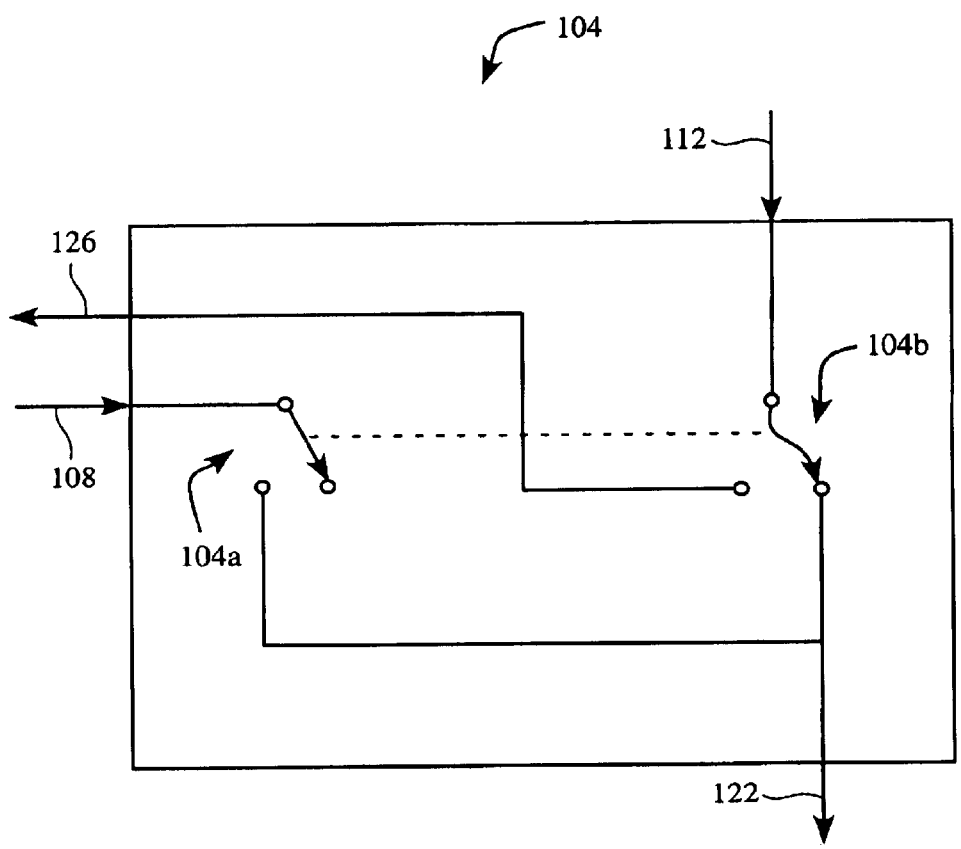
FIG. 4A shows an interrupt gate in accordance with one embodiment of the present invention.

FIG. 4A shows an interrupt gate 104 in accordance with one embodiment of the present invention. In this embodiment, the interrupt gate 104 is connected to an interrupt line 126, an interrupt line 108, a RAID connection 112, and a connection 122. It should be appreciated that the interrupt gate 104 may be connected to any different type of interrupt lines or connections such as, for example, a SCSI connection 114. In a first configuration, the connection 112 is linked to the connection 122 by a switch 104b within the interrupt gate 104. In this configuration, when the connections 112 and 122 are connected by the switch 104b, a switch 104a does not connect the interrupt line 108 and the connection 122. When the interrupt gate 104 is in the first configuration, interrupts from a RAID channel control 116a is directed to a host CPU 100 (See FIG. 4 above for an overall configuration of a dual channel SCSI control system).

In a second configuration, the switch 104b connects the interrupt line 126 to the connection 112. In this case, the switch 104a connects the interrupt line 108 with the connection 122. It should be appreciated that although the switches 104a and 104b are illustrated in a simplistic manner, they may consist of any number or type of logic gates which may form an integrated circuit or any other association of transistors.

When the RAID IOP 106 determines that the RAID channel control 116a is the part of the SCSI chip 116 which is devoted to RAID control, the interrupt gate 104 is set to RAID as in the second configuration. In this circumstance, interrupts from the RAID control channel 116a by way of connection 112 is sent to the RAID IOP 106 on the interrupt line 126 while interrupts from the RAID IOP 106 is sent to the host CPU 100 via the interrupt line 108 and the connection 122. It should be appreciated that a similar interrupt gate with similar configurations may be utilized to control the communications between any other type of channel control and processor such as, for example, between the SCSI channel control 116b and a host CPU 100.

Figure 5:
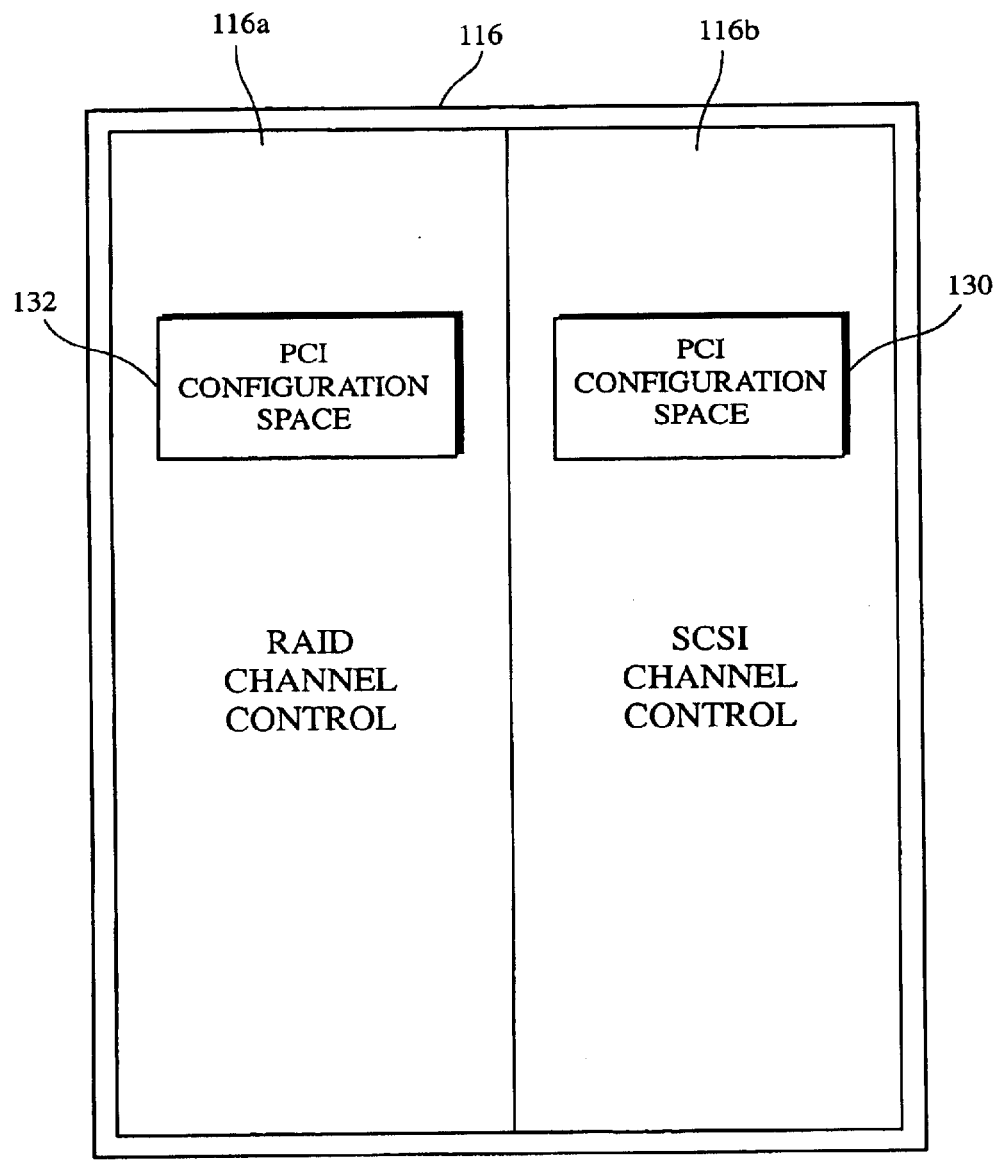
FIG. 5 depicts a SCSI chip configuration in accordance with one embodiment of the present invention.

FIG. 5 depicts a SCSI chip 116 configuration in accordance with one embodiment of the present invention. In this embodiment, one part of the SCSI chip 116 is devoted to the RAID channel control 116a and another part of the SCSI chip 116 is devoted to the SCSI channel control 116b. A PCI configuration space 132 is contained within the RAID channel control 116a, and a PCI configuration space 130 is contained within SCSI channel control 116b. As stated previously, it should be understood that both the channel controls in the SCSI chip 116 may be devoted to RAID or SCSI or a combination of the two.

In one embodiment, the PCI configuration space 130 contains identification information about the specific SCSI peripheral device(s) connected to the host computer. In another embodiment, the PCI configuration space 132 may contain identification information about the RAID arrays 168 used by the host computer. It should be appreciated that the SCSI devices connected to the SCSI chip 116 may be one or more of many different devices such as hard disk drives, optical drives, removable drives, etc. The PCI configuration spaces 130 and 132 allow the control channels 116a and 116b to identify, communicate with, and control the devices connected to the SCSI chip 116.

Figure 6:
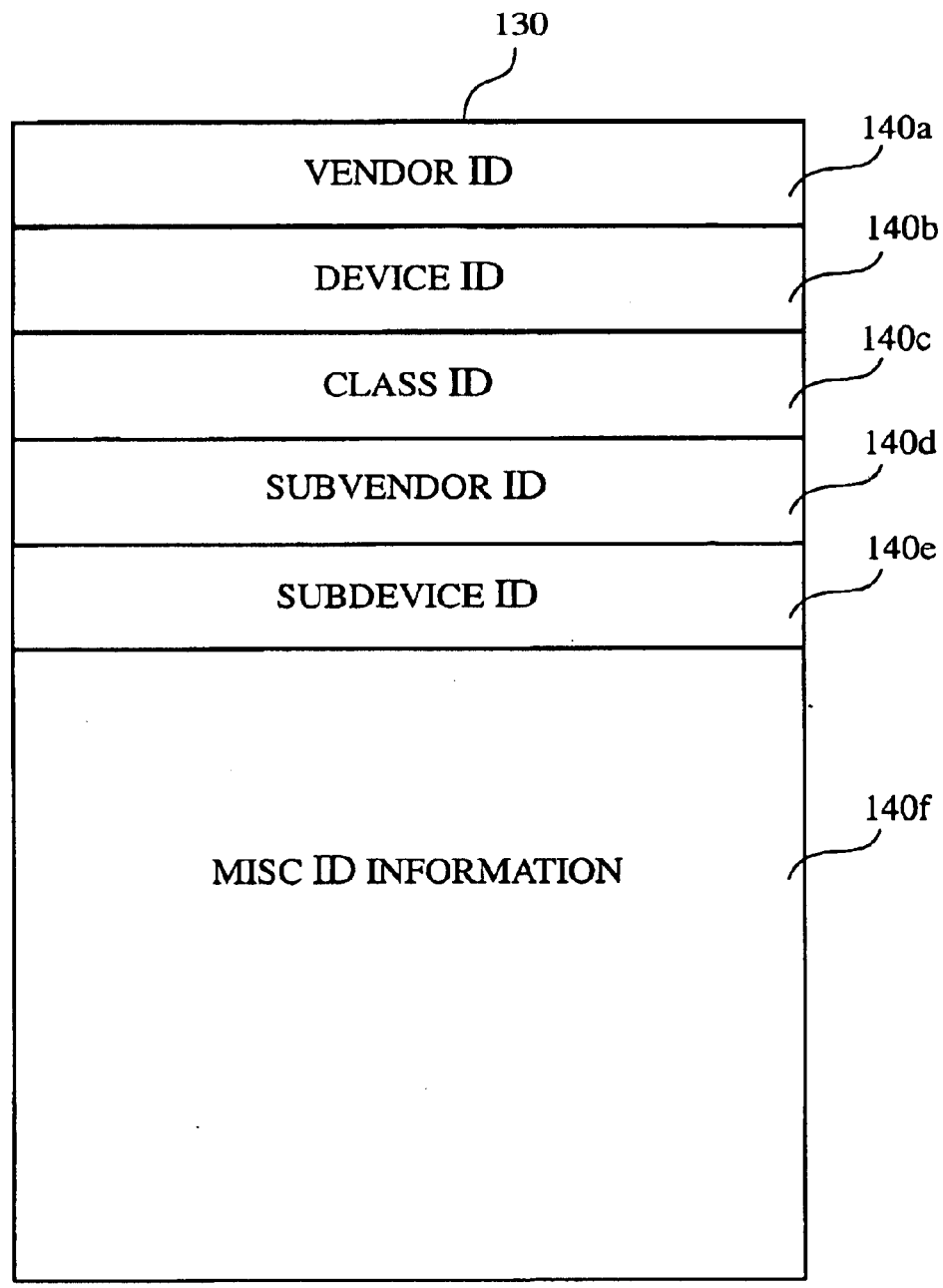
FIG. 6 shows the PCI configuration space with identified subparts in accordance with one embodiment of the present invention.

FIG. 6 shows the PCI configuration space 130 with identified subparts in accordance with one embodiment of the present invention. The PCI configuration space 130 contains a vendor ID 140a, a device ID 140b, a class ID 140c, a subvendor ID 140d, a subdevice ID 140e, and miscellaneous ID information 140f. The vendor ID 140a has data that describes the originator of a particular device attached to the host computer. The subvendor ID 140d has data that describes the originator of the board on which the device is located. The device ID 140b is a number assigned by the originator of the device which is connected with the host computer. The subdevice ID 140e is a number assigned by the originator of a board (containing the device) to identify it. The class ID 140c shows the type of device (e.g., SCSI, RAID, etc.), and the miscellaneous ID information 140f can contain any other type of information desired by a user. The host CPU 100 and the RAID IOP 106 use the identification information within the PCI configuration space 130 to identify and control a particular device connected to a SCSI chip channel. One skilled in the art will realize that the above embodiment is only a representation of a PCI configuration space or header and that the PCI configuration space may contain other types of data or the same data located in various different registers.

Figure 7:
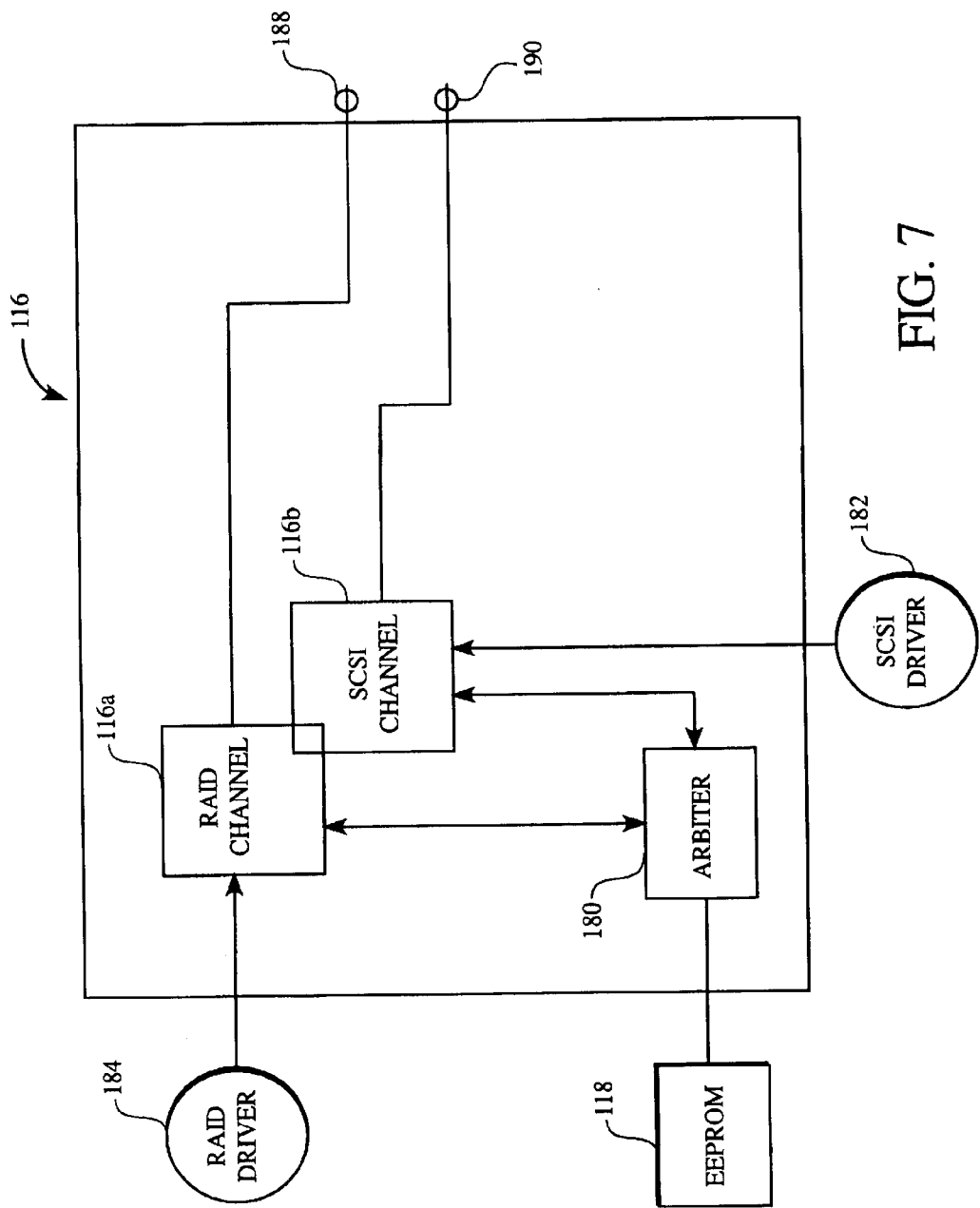
FIG. 7 shows the internal structure of the SCSI chip in accordance with one embodiment of the present invention.

FIG. 7 shows the internal structure of the SCSI chip 116. In one embodiment, the RAID channel control 116a and the SCSI channel control 116b are connected to an arbiter 180. The RAID channel control 116a, the SCSI channel control 116b, and the arbiter 180 are all located in one SCSI chip. The arbiter 180 is also linked to the EEPROM chip 118 located outside of the SCSI chip. The RAID channel control 116a is attached to an interrupt 188, and the SCSI channel control 116b is attached to an interrupt 190. A RAID driver 184 directs the RAID channel control 116a and a SCSI driver 182 directs the SCSI channel control.

At bootup, the RAID channel control 116a and the SCSI channel control 116b retrieve configuration information from the EEPROM chip 118 through the arbiter 180. In one embodiment, the RAID driver 184 instructs the RAID channel control 116a to access the EEPROM chip 118 to obtain specific configuration information, and at the same time, the SCSI driver 182 also instructs the SCSI channel control 116b to access the EEPROM chip 118 to obtain additional configuration information. Without the arbiter 180, the two channels would interfere with each other and data transmission may be delayed or corrupted. In this type of situation, the arbiter manages the data request from both the RAID channel control 116a and the SCSI channel control 116b and makes sure that the two channels do not interfere with each other by prioritizing the data transmission between the channels.

In one embodiment, the RAID channel control 116a utilizes the interrupt 188 to communicate with the RAID IOP 106 and the SCSI channel control 116b uses the interrupt 190 to communicate with the host CPU 100. The use of the separate interrupts allows the two SCSI chip channels to have seamless communication with the RAID IOP 106 or the host CPU because the SCSI chip channels do not have to clash over the use of a single interrupt line. If only one interrupt line were used, delays in communication may occur when a driver is called and the interrupt is for the other driver. This is especially troublesome when the two drivers are running on different CPU's. Therefore, the separate interrupt lines create a more efficient way for the SCSI chip channels to communicate with outside processors and/or devices.

Figure 8:
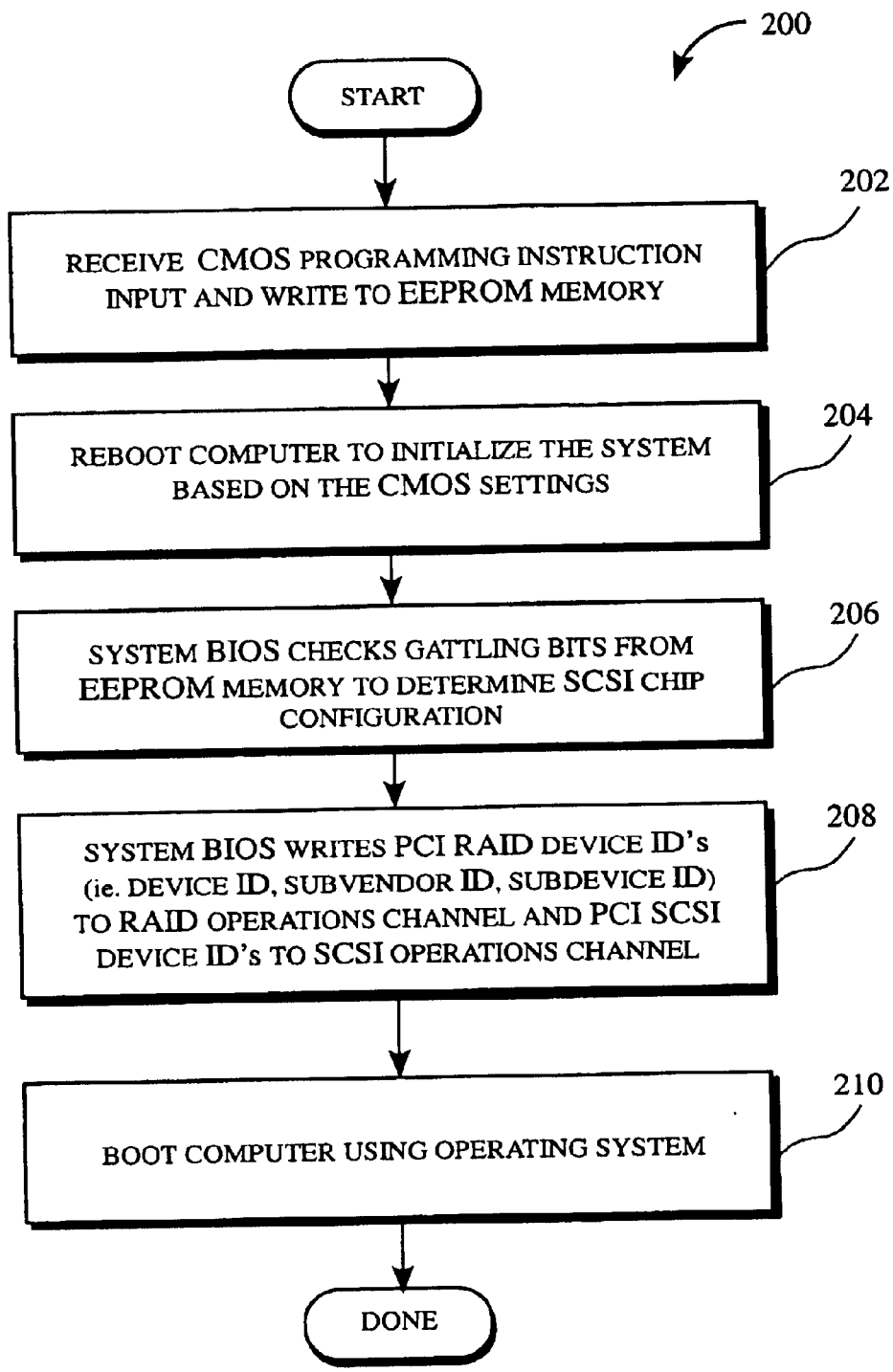
FIG. 8 depicts a flowchart defining a process for programming the SCSI chip with channel identification information by way of the system BIOS in accordance with one embodiment of the present invention.

FIG. 8 depicts a flowchart 200 defining a process for programming a SCSI chip 116 with channel identification information by way of the system BIOS 120, in accordance with one embodiment of the present invention. It should be understood that the processes depicted in the flowchart 200 may be in a program instruction form which can be written on any type of computer readable media. For instance, the program instructions can be in the form of software code developed using any suitable type of programming language. For completeness, the process flow of FIG. 8 will illustrate an exemplary process whereby the SCSI chip 116 is programmed to provide separate SCSI and RAID channel operational capabilities.

The initial operation 202 receives CMOS programming instruction input and writes the input information to EEPROM memory. In accordance with the invention, the CMOS programming is configured to, among performing other settings, set specific Gattling bits that will identify use settings of each side of the SCSI chip 116. This information is then written into the EEPROM memory so the system BIOS will be able to read that information upon system bootup. As mentioned above, the Gattling bits are, in one embodiment, represented as two Gattling bits.

For instance, the Gattling bits can determine that one SCSI chip channel is the RAID channel control 116a and the other SCSI chip channel is the SCSI channel control 116b. It should be appreciated that the Gattling bits may contain any type of configuration information allowing for a variety of configurations such as, for example, having two SCSI channel controls or two RAID channel controls. After operation 202, the method proceeds to operation 204 where the computer is rebooted to initialize the system using the CMOS settings. During initialization, the system BIOS 120 checks the configuration of the computing system.

After operation 204, the method proceeds to operation 206 where the system BIOS 120 checks Gattling bits from EEPROM memory to determine SCSI chip configuration. In one embodiment, the Gattling bits may be checked from a system registry or a subsystem. It should also be appreciated that any other type of storage may be utilized in place of the EEPROM memory. In operation 206, as computer bootup progresses, the system BIOS 120 examines the Gattling bits set in the EEPROM memory by the user. In one embodiment, a subsystem BIOS may examine the Gattling bits. The method then progresses to operation 208 where the system BIOS 120 writes PCI RAID device ID's (i.e. device ID, subvendor ID, and subdevice ID) to the RAID channel control 116a and PCI SCSI device ID's (i.e. device ID, subvendor ID, and subdevice ID) to the SCSI channel control 116b. Now, the methods ends with operation 210 where the booting process of the computer is complete as the operating system (OS) takes over.

Figure 9:
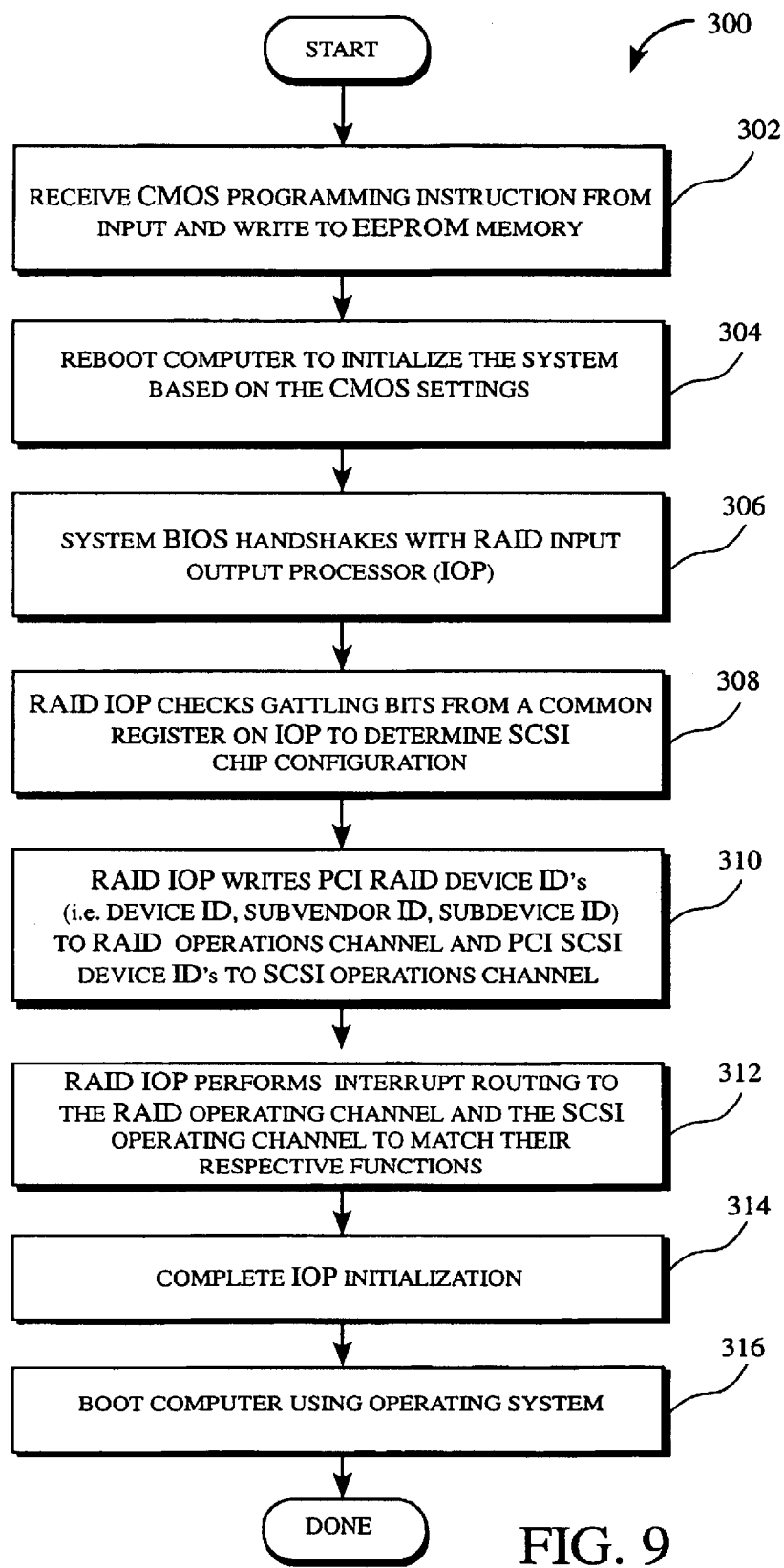
FIG. 9 depicts a flowchart defining a process for programming the SCSI chip with channel identification information by the RAID IOP in accordance with one embodiment of the present invention.

FIG. 9 depicts a flowchart 300 defining a process for programming the SCSI chip 116 with channel identification information by the RAID IOP 106 in accordance with one embodiment of the present invention. It should be understood that the processes depicted in the flowchart 300 may be in any program instruction form written on any type of computer readable media. For instance, the program instructions can be in the form of software code developed using any suitable type of programming language. For completeness, the process flow of FIG. 9 will illustrate another exemplary process whereby the a single SCSI chip 116 is programmed to provide separate SCSI and RAID operational capabilities.

The initial operation 302 receives CMOS programming instruction from input and writes the programming instruction to EEPROM memory. As above, a user will specify how each portion of the single SCSI chip is to operate by inputting the appropriate information into the CMOS programming interface. That information is then written into the EEPROM memory so the system BIOS will be able to read that information upon system bootup. It should be appreciated that any type of memory, storage, device, or system capable of holding data may be utilized in place of the EEPROM memory.

After operation 302, the method proceeds to operation 304 where the computer is rebooted to initialize the system based on the CMOS settings. It should be understood that the CMOS settings may be any settings utilized by a computer that is stored on any type of storage. The computer reboots because without rebooting, the system is not be able to utilize the new information inputted into the EEPROM memory. After operation 304, the method proceeds to operation 306 where the system BIOS handshakes with the RAID IOP 106. In operation 306, the Gattling bits are set into a common register of the IOP so the RAID IOP 106 may have access to the information. The specifics of the handshake process will be further explained below. After operation 306, the method proceeds to operation 308 where the RAID IOP 106 checks the Gattling bits from a common register on the RAID IOP 106 to determine the SCSI chip configuration. Again, the Gattling bits tell the RAID IOP 106 which SCSI chip channel controls the devices associated with the SCSI chip 116.

After operation 308, the method proceeds to operation 310 where the RAID IOP 106 writes PCI RAID device ID's (i.e. device ID, subvendor ID, subdevice ID) to the RAID channel control 116a and PCI SCSI device ID's (i.e. device ID, subvendor ID, subdevice ID) to SCSI channel control 116b. In operation 310, the SCSI chip 116 receives identification information regarding the type of devices the SCSI channels will be controlling. This identification information allows the host CPU 100 and RAID IOP 106 to know which device or devices to monitor and manage. After operation 310, the method proceeds to operation 312 where the RAID IOP 106 performs interrupt routing (or "interrupt steering") to the RAID operating channel and the SCSI operating channel to match their respective functions. In operation 312, the RAID IOP 106 uses the identification information received from the common register to set the gates 102 and 104 (as shown in FIG. 4A) to the appropriate configurations. In one embodiment, the gates 104 and 102 are set to RAID and SCSI channels respectively. After operation 312, the method proceeds to operation 314 where the IOP initialization is completed. During operation 314, the RAID IOP 106 is initialized where the RAID IOP 106 is configured for use by the host computer. For example, during the RAID IOP 106 initialization process, tasks such as memory testing and IOP peripheral initialization for RAID components are conducted. For a more detailed discussion of basic RAID IOP operations, reference may be made to the Intel i960® RM/RN I/O Processor Developer's Manual and the Intel i960® RM/RN/RS I/O Processor Specification Update, February, 2000. These referenced materials are incorporated herein by reference. After operation 314, the method proceeds to operation 316 where after the IOP is initialized, the computer is booted and the operating system takes over.

Figure 10:
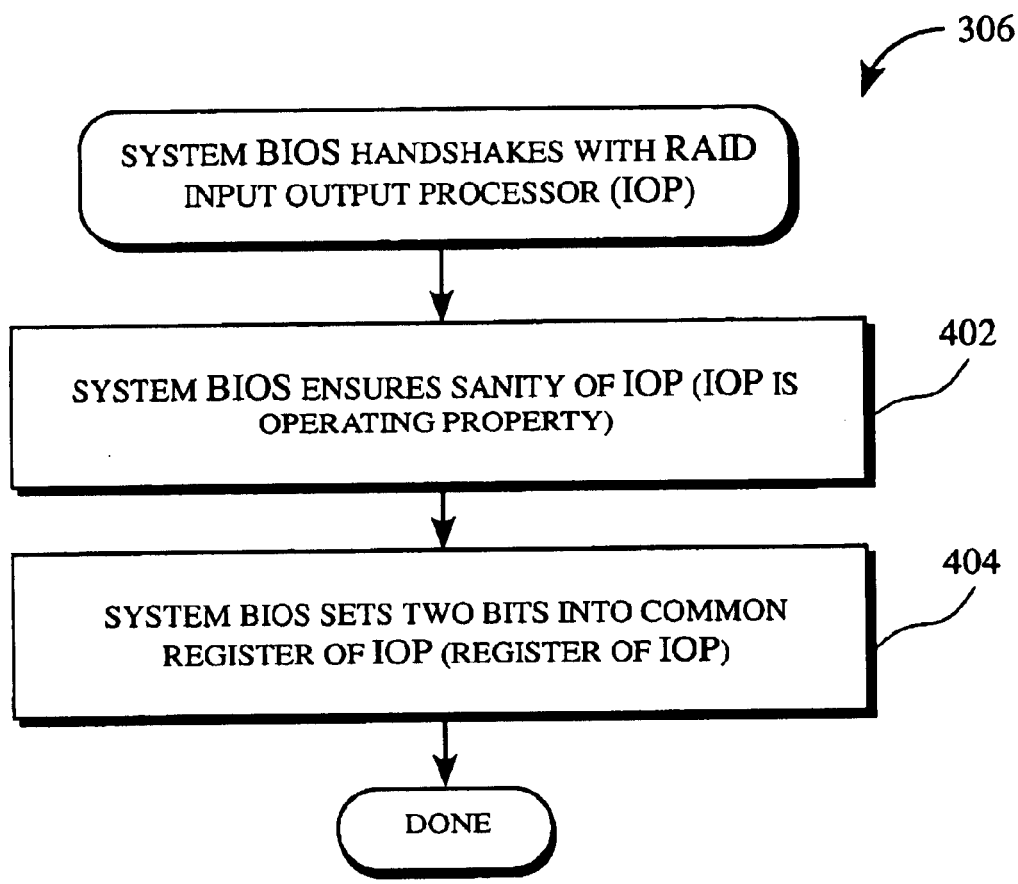
FIG. 10 depicts a flowchart defining a process for the handshaking of the system BIOS with the RAID IOP in accordance with one embodiment of the present invention.

FIG. 10 depicts a flowchart 306 defining a process for the handshaking of the system BIOS 120 with the RAID IOP 106 in accordance with one embodiment of the present invention. It should be understood that the processes depicted in the flowchart 306 may be in a program instruction form written on any type of computer readable media. For instance, the program instructions can be in the form of software code developed using any suitable type of programming language. For completeness, the process flow of FIG. 10 will illustrate an exemplary process whereby the system BIOS 120 communicates with the RAID IOP 106 to transfer information necessary for the configuration of the SCSI chip 116.

The initial operation 402 ensures the sanity of the RAID IOP 106. That is, the system BIOS 120 communicates with the RAID IOP 106 and determines if the RAD IOP 106 is operating properly. After operation 402, the method proceeds to operation 404 where the system BIOS 120 sets two bits into the common register of the RAID IOP 106. In one embodiment, the system BIOS 120 becomes aware of the existence of the Gattling bits by being specially written. In operation 402, after the system BIOS 120 reads the two Gattling bits from the EEPROM during system bootup and after the system BIOS 120 determines that the RAID IOP 106 is working properly, the system BIOS 120 writes the two Gattling bits into the common register of the RAID IOP 106. By doing this, the RAID IOP 106 will be able to determine (as in operation 308 in FIG. 9) how to configure the SCSI chip 116. The two Gattling bits contains information regarding the functionality of the devices attached to the host computer through the SCSI chip 116.

From the foregoing disclosure, it should be clear that a single chip can be made to operate as if it were two separate chips. The single chip (e.g., a SCSI chip) can then be used in environments where conventional SCSI devices are connected to the computer system and where there is a need to connect RAID storage devices (e.g., as is the case in server systems). In such cases, the configuration of the SCSI chip can be done such that each part of the chip can communicate with appropriate processors. In this manner, a SCSI channel of a chip can communicate with a computer's CPU and a RAID channel of the same chip can communicate with a RAID IOP. Not only does this design reduce cost in that few chips are required to complete an implementation, but communication inconsistencies are also eliminated. In sum, the gattling features of the present invention provide for a robust configuration that improves on overall system efficiency and reduces the cost of implementation.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for utilizing a SCSI chip capable of controlling different types of devices, comprising:
    setting a first channel control in the SCSI chip, wherein the first channel control is a RAID channel control;
    setting a second channel control in the SCSI chip, the second channel control being a SCSI channel control, wherein the setting the first channel control in the SCSI chip and setting the second channel control in the SCSI chip includes:
        communicating with a system BIOS to establish access to a CMOS programming instruction;
    managing a first peripheral device type using the first channel control; and
    managing a second peripheral device type using the second channel control.

2. A method for utilizing a SCSI chip capable of controlling different types of devices as recited in claim 1, wherein
    communicating further comprises the system BIOS ensuring that a RAID IOP is operating properly and the system BIOS setting Gattling bits into a common register of the RAID IOP, and
    determining a SCSI chip configuration by examining the Gattling bits;
    writing a first device ID's to the first channel control; and
    writing a second device ID's to the second channel control.

3. A method for utilizing a SCSI chip capable of controlling different types of devices as recited in claim 1, wherein the setting the first channel control and setting the second channel control includes:
    determining a SCSI chip configuration by examining a CMOS programming instruction;
    writing a first device ID's to the first channel control; and
    writing a second device ID's to the second channel control;
    wherein the determining the SCSI chip configuration by examining the CMOS programming instruction includes checking Gattling bits from a memory to establish types of devices the SCSI chip is required to control.

4. A method for utilizing a SCSI chip capable of controlling different types of devices as recited in claim 1, wherein the setting the first channel control includes configuring a first PCI ID configuration register within the first channel control, the first PCI ID configuration register being configured to hold a first channel device identification information.

5. A method for utilizing a SCSI chip capable of controlling different types of devices as recited in claim 4, wherein the setting the second channel control includes configuring a second PCI ID configuration register within the second channel control, the second PCI ID configuration register being configured to hold a second channel device identification information.

6. A method for utilizing a SCSI chip capable of controlling different types of devices as recited in claim 5, where the first channel device identification information and the second channel device identification information each include:
    a vendor ID;
    a device ID;
    a class ID;
    a subvendor ID information;
    a subdevice ID; and
    a miscellaneous ID information.

7. A dual channel SCSI chip capable of controlling different types of peripheral devices, comprising:
    a first channel, the first channel for managing a first peripheral device, wherein the first channel is configured to contain a first configuration register;
    a second channel, the second channel for managing a second peripheral device, wherein the second channel is configured to contain a second configuration register;
    a first interrupt, the first interrupt being configured to connect with the first channel;
    a second interrupt, the second interrupt being configured to connect with the second channel; and
    an arbiter, the arbiter being configured to control access by the first channel and the second channel to a memory having configuration information for the dual channel SCSI chip.

8. A dual channel SCSI chip capable of controlling different types of peripheral devices as recited in claim 7, wherein the first configuration register is a first PCI ID configuration register and the second configuration register is a second PCI ID configuration register.

9. A dual channel SCSI chip capable of controlling different types of peripheral devices as recited in claim 8, wherein the first PCI ID configuration register is configured to contain first channel device identification information and the second PCI ID configuration register is configured to contain second channel device identification information.

10. A dual channel SCSI chip capable of controlling different types of peripheral devices as recited in claim 9, wherein the first channel device identification information and the second channel device identification information each include:
    a vendor ID;
    a device ID;
    a class ID;
    a subvendor ID information;
    a subdevice ID; and
    a miscellaneous id information.

11. A dual channel SCSI chip capable of controlling different types of peripheral devices as recited in claim 9, wherein the first channel device identification information and the second channel device identification information are each software programmable.

12. A dual channel SCSI chip capable of controlling different types of peripheral devices as recited in claim 11, wherein the first channel device identification information and the second channel device identification information is established by data contained within Gattling bits which indicates the types of devices the SCSI chip is required to control.

13. A dual channel SCSI chip capable of controlling different types of peripheral devices as recited in claim 12 wherein the Gattling bits are set in the memory and are retrieved by a system BIOS for identification of the first channel and the second channel.

14. A dual channel SCSI chip capable of controlling different types of peripheral devices as recited in claim 7, wherein the first channel is a RAID channel and the second channel is a SCSI channel.

15. A dual channel SCSI chip capable of controlling different types of peripheral devices as recited in claim 14, wherein the RAID channel is connected to a RAID input output processor (IOP) and the SCSI channel is connected to a host CPU.

16. A dual channel SCSI chip capable of controlling different types of peripheral devices as recited in claim 7, wherein the first channel and the second channel are determined to be one of a SCSI channel and a RAID channel depending on a configuration of the first interrupt and the second interrupt.

17. A dual channel SCSI chip capable of controlling different types of peripheral devices as recited in claim 7, wherein the memory is an EEPROM chip.

18. A method for utilizing a SCSI chip capable of controlling different types of devices, comprising:
    setting a CMOS programming instruction in a memory;
    rebooting a computer to initialize the computer based on the CMOS programming instruction;
    communicating with a system BIOS to establish access to the CMOS programming instruction;
    determining a SCSI chip configuration by examining the CMOS programming instruction;
    writing a first device ID's to a first SCSI chip channel; and
    writing a second device ID's to a second SCSI chip channel.

19. A method for utilizing a SCSI chip capable of controlling different types of devices as recited in claim 18, wherein the setting the CMOS programming instruction includes receiving input from a user indicating data necessary to configure the SCSI chip and writing the CMOS programming instruction input into the memory.

20. A method for utilizing a SCSI chip capable of controlling different types of devices as recited in claim 18, wherein the communicating with the system BIOS to establish access to the CMOS programming instruction includes,
    the system BIOS ensuring that the RAID IOP is operating properly, and
    the system BIOS setting Gattling bits into a common register of the RAID IOP.

21. A method for utilizing a SCSI chip capable of controlling different types of devices as recited in claim 20, wherein the determining the SCSI chip configuration by examining the CMOS programming instruction includes checking the Gattling bits from the common register to establish the types of devices the SCSI chip is required to control.

22. A method for utilizing a SCSI chip capable of controlling different types of devices as recited in claim 18, wherein the first SCSI chip channel is a RAID channel control and the second SCSI chip channel is a SCSI channel control, the RAID channel control managing a RAID array device and the SCSI channel control managing a SCSI device.

23. A method for utilizing a SCSI chip capable of controlling different types of devices as recited in claim 18, wherein the first device ID and the second device ID include a device ID, a subvendor ID, and a subdevice ID.

24. A method for configuring a SCSI chip capable of controlling different types of devices, comprising:
    setting a CMOS programming instruction in a memory;
    rebooting a computer to initialize the CMOS programming instruction into a memory;
    determining a SCSI chip configuration by examining the CMOS programming instruction;
    writing a first device ID's to a first SCSI channel; and
    writing a second device ID's to a second SCSI channel;
    wherein the determining the SCSI chip configuration by examining the CMOS programming instruction includes checking Gattling bits from the memory to establish types of devices the SCSI chip is required to control.

25. A method for configuring a SCSI chip capable of controlling different types of devices as recited in claim 24, wherein the setting the CMOS programming instruction includes receiving input from a user indicating data necessary to configure the SCSI chip and writing the CMOS programming instruction input into the memory.

26. A method for configuring a SCSI chip capable of controlling different types of devices as recited in claim 24, wherein the first SCSI chip channel is a RAID channel control and the second SCSI chip channel is a SCSI channel control, the RAID channel control managing a RAID arrays device and the SCSI channel control managing a SCSI devices.

27. A method for curing a SCSI chip capable of controlling different types of devices as recited in claim 24, wherein the first device ID and the second device ID include a device ID, a subvendor ID, and a subdevice ID.

* * * * *